(12) United States Patent
Yamashita

(10) Patent No.: US 9,948,200 B2
(45) Date of Patent: Apr. 17, 2018

(54) CHARGE AND DISCHARGE CIRCUIT, CONTROL METHOD FOR CHARGE AND DISCHARGE CIRCUIT, CONTROL DEVICE FOR CHARGE AND DISCHARGE CIRCUIT, AND DIRECT POWER CONVERTER

(71) Applicant: DAIKIN INDUSTRIES, LTD., Osaka-Shi, Osaka (JP)

(72) Inventor: Naoya Yamashita, Osaka (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 0 days.

(21) Appl. No.: 15/532,613

(22) PCT Filed: Dec. 14, 2015

(86) PCT No.: PCT/JP2015/084887
§ 371 (c)(1),
(2) Date: Jun. 2, 2017

(87) PCT Pub. No.: WO2016/098714
PCT Pub. Date: Jun. 23, 2016

(65) Prior Publication Data
US 2017/0324348 A1 Nov. 9, 2017

(30) Foreign Application Priority Data
Dec. 17, 2014 (JP) .................................. 2014-254777

(51) Int. Cl.
*H02M 5/458* (2006.01)
*H02M 1/08* (2006.01)
*H02M 1/12* (2006.01)

(52) U.S. Cl.
CPC ............ *H02M 5/458* (2013.01); *H02M 1/08* (2013.01); *H02M 1/126* (2013.01)

(58) Field of Classification Search
CPC ......... H02M 5/458; H02M 1/08; H02M 1/126
See application file for complete search history.

(56) References Cited

U.S. PATENT DOCUMENTS

| 7,907,427 B2 | 3/2011 | Sakakibara et al. |
| 9,246,398 B2 | 1/2016 | Sakakibara et al. |

(Continued)

FOREIGN PATENT DOCUMENTS

| JP | 4067021 B2 | 3/2008 |
| JP | 2011-193678 A | 9/2011 |

(Continued)

*Primary Examiner* — Jue Zhang
*Assistant Examiner* — Lakaisha Jackson
(74) *Attorney, Agent, or Firm* — Birch, Stewart, Kolasch & Birch, LLP

(57) ABSTRACT

A first capacitor is connected between first and second power supply lines. A reactor is connected in series with the first power supply line or the second power supply line. A single-phase AC voltage is applied to a rectifying circuit. The rectifying circuit, which includes the first capacitor and the reactor, outputs a rectified voltage to the first and second power supply lines. A buffer circuit includes a second capacitor provided between the first and second power supply lines. The buffer circuit discharges the second capacitor at a controllable duty ratio. A booster circuit boosts the rectified voltage to charge the second capacitor. A DC current to be input to the booster circuit is reduced more as a voltage across the reactor is higher.

19 Claims, 10 Drawing Sheets

(56) References Cited

U.S. PATENT DOCUMENTS

| | | |
|---|---|---|
| 9,450,502 B2 | 9/2016 | Sakakibara |
| 2015/0244282 A1 | 8/2015 | Yamashita et al. |
| 2016/0359423 A1* | 12/2016 | Ohta ..................... H02M 1/12 |
| 2017/0237334 A1* | 8/2017 | Kawashima ............ H02M 1/12 363/44 |
| 2017/0310235 A1* | 10/2017 | Sakakibara ......... H02M 5/4585 |

FOREIGN PATENT DOCUMENTS

| | | |
|---|---|---|
| JP | 5257533 B2 | 8/2013 |
| JP | 2014-82926 A | 5/2014 |
| JP | 2014-96976 A | 5/2014 |

* cited by examiner

F I G . 3
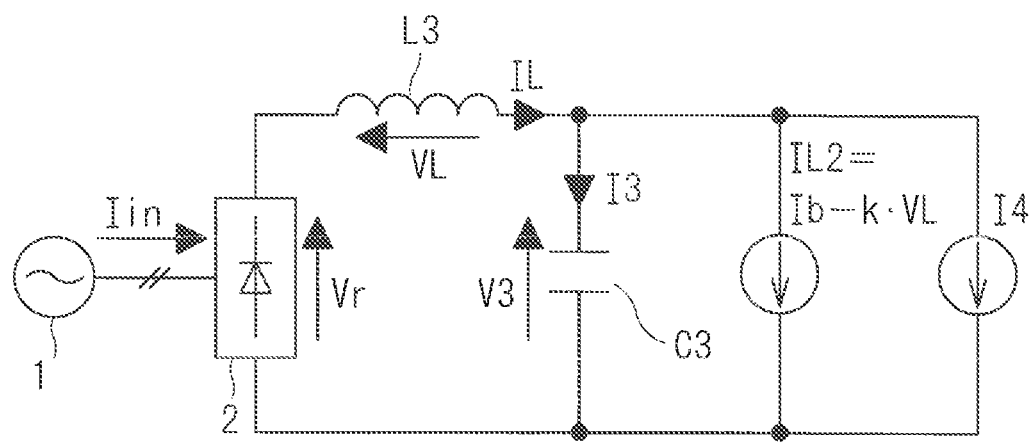
F I G . 4
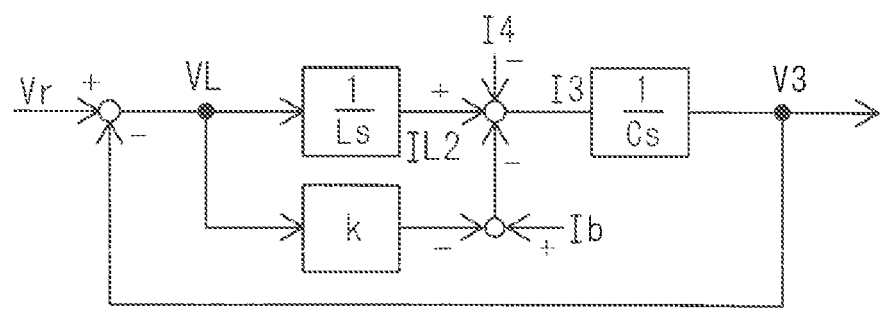

F I G. 1 4
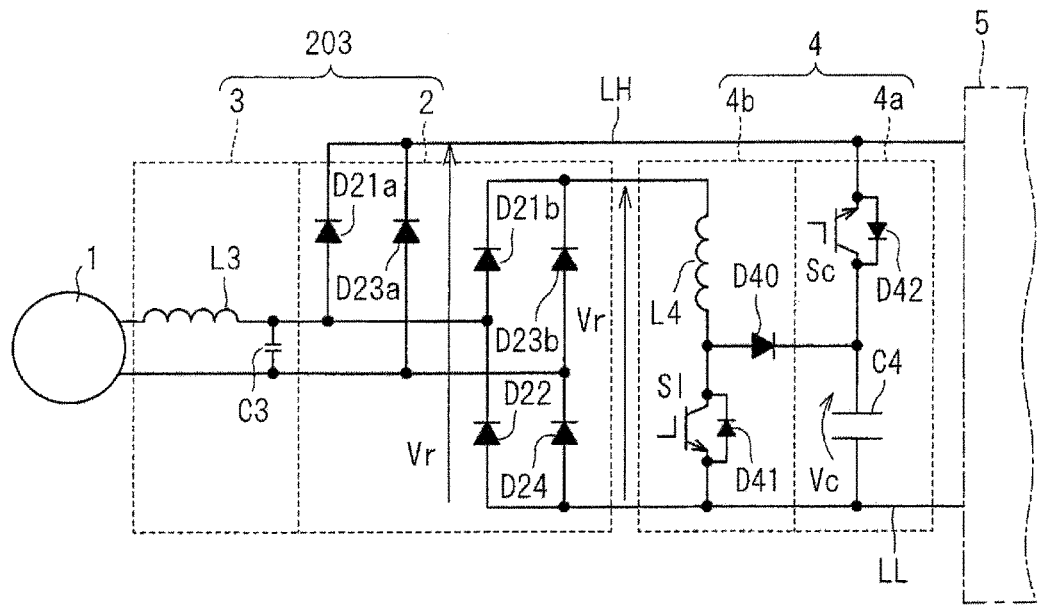
F I G. 1 5
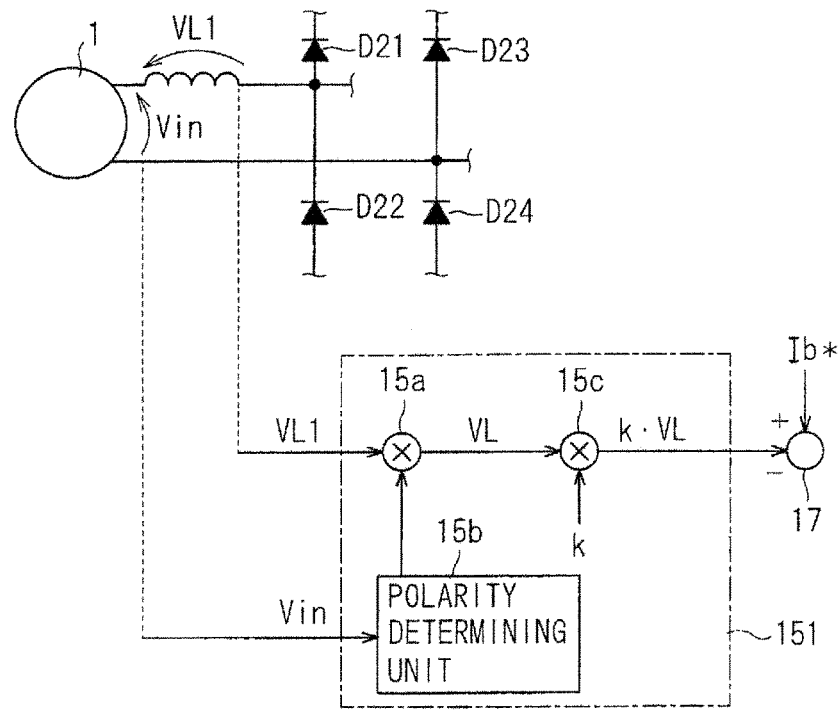

CHARGE AND DISCHARGE CIRCUIT, CONTROL METHOD FOR CHARGE AND DISCHARGE CIRCUIT, CONTROL DEVICE FOR CHARGE AND DISCHARGE CIRCUIT, AND DIRECT POWER CONVERTER

TECHNICAL FIELD

This invention relates to a charge and discharge circuit included in a direct power converter, a method for controlling the charge and discharge circuit, a control device for the charge and discharge circuit, and the direct power converter.

BACKGROUND ART

Japanese Patent Application Laid-Open No. 2014-96976, Japanese Patent Application Laid-Open No. 2011-193678, and Japanese Patent Application Laid-Open No. 2014-82926 disclose direct power converters. The direct power converters disclosed by these include a booster circuit and a capacitor that maintains a voltage boosted by the booster circuit. In the DC power to be supplied to an inverter, the power from the capacitor and the power obtained from a diode rectifier are appropriately processed. Consequently, the inverter receives increased DC voltage.

Although Japanese Patent No. 4067021 also discloses a direct power converter, the direct power converter includes neither the booster circuit nor the capacitor. On the other hand, the direct power converter includes, at an input side of the inverter, an LC filter that suppresses a carrier current of the inverter.

The direct power converter disclosed by Japanese Patent Application Laid-Open No. 2014-96976 includes not only the booster circuit and the capacitor but also the LC filter. Furthermore, the direct power converter includes a diode between the capacitor and the LC filter to prevent a current from flowing from the capacitor to the LC filter.

In any of Japanese Patent Application Laid-Open No. 2014-96976, Japanese Patent No. 4067021, and Japanese Patent No. 5257533, a current for suppressing resonance of the LC filter (hereinafter referred to as a "suppressing current") is obtained from a voltage generated in a reactor of the LC filter (or a voltage generated in a capacitor of the LC filter), and is superimposed on a current flowing through the inverter (hereinafter referred to as an "inverter current").

SUMMARY

Problems to be Solved by the Invention

The LC filter is provided for attenuating, in the current flowing through the inverter, a carrier frequency component of the inverter. Thus, the resonance frequency of the LC filter is preferably set to a fraction of the carrier frequency.

In such a case, when the suppressing current is superimposed on the inverter current, delay in sampling of a control system that controls the inverter and in updating of a command value is not negligible.

In Japanese Patent Application Laid-Open No. 2014-96976, changing, in a DC voltage to be input from a DC link to the inverter, a value indicating a ratio of a voltage to be applied from the diode rectifier is accompanied by a change in the DC voltage, thus reducing an average of the DC voltage.

The present invention has an object of providing a technique for preventing the sampling of the control system that controls the inverter and the updating of a command value from being degraded, even when the resonance of the LC filter is suppressed using the suppressing current.

Means to Solve the Problems

The method for controlling a charge and discharge circuit according to the present invention is a method for controlling a charge and discharge circuit in a direct power converter. The direct power converter includes: a first power supply line (LH); a second power supply line (LL) to which a potential lower than a potential applied to the first power supply line is applied; a rectifying circuit (203) having an input side to which a single-phase AC voltage (Vin) is applied, and an output side to be connected to the first and second power supply lines; the charge and discharge circuit (4) that is provided between the first and second power supply lines and is closer to the output side of the rectifying circuit; and an inverter (5) that receives a DC voltage (Vdc) that is a voltage between the first and second power supply lines. The rectifying circuit includes: a diode rectifier (2) that performs single-phase full-wave rectification; a first capacitor (C3) to be connected between the first and second power supply lines directly or indirectly through the diode rectifier; and a first reactor (L3) to be connected in series with the first power supply line or the second power supply line directly or indirectly through the diode rectifier, the first reactor being more distant from the inverter than the first capacitor is.

The charge and discharge circuit includes: a buffer circuit (4a) including a second capacitor (C4) provided between the first and second power supply lines, the buffer circuit discharging the second capacitor at a controllable duty ratio (dc); and a booster circuit (4b) that boosts a rectified voltage (V3, Vr) from the rectifying circuit to charge the second capacitor.

In the controlling method, a DC current (IL2) to be input to the booster circuit is reduced more as a voltage (VL) across the first reactor is higher.

When the first reactor (L3) is provided between the diode rectifier (2) and the first capacitor (C3), a direction opposite to a direction of a current flowing through the first reactor is used as a positive polarity of the voltage (VL) across the first reactor. When the first reactor (L3) is more distant from the inverter (5) than the diode rectifier (2) is, a direction of the single-phase AC voltage (Vin) from a high potential to a low potential is used as a positive polarity of the voltage (VL) across the first reactor.

In the example controlling method, the DC current (IL2) is controlled using a second command value (Ib*−k·VL) as a target value, the second command value being obtained by subtracting a correction value (k·VL) from a first command value (Ib*) determined by an amplitude (Im) of an AC current (Iin) to be input to the diode rectifier (2) and a voltage (Vr) to be output by the diode rectifier, the correction value being directly proportional to the voltage (VL) across the first reactor.

Here, the booster circuit (4b) includes a second reactor (L4) through which the DC current (IL2) flows, and chops the DC current to determine whether to output the DC current to the second capacitor. The controlling method is performed based on a result of comparison between a duty ratio (dl) and a predetermined carrier (C2), the duty ratio being determined using the second command value (Ib*−k·VL), a voltage (Vc) across the second capacitor (C4), the single-phase AC voltage (Vin), and an inductance (Lm) of the second reactor.

For example, the buffer circuit (4a) charges the first capacitor (C3) during a period in which a cosine value (cos(2ωt)) is negative, and discharges the first capacitor during a period in which the cosine value is positive, the cosine value being a cosine of a value twice a phase (ωt) of the single-phase AC voltage (Vin).

Alternatively, the buffer circuit (4a) charges the first capacitor (C3) during at least a part of a period in which the duty ratio (dc) is larger than 0.

The control device for a charge and discharge circuit according to the present invention is the control device (10) that controls the charge and discharge circuit (4) when the chopping is performed, and includes: a subtractor (17) that subtracts the correction value (k·VL) from the first command value (Ib*) to obtain the second command value (Ib*−k·VL); a chopper controller (16) that determines the duty ratio (dl) using the second command value, the voltage (Vc) across the second capacitor (C4), the single-phase AC voltage (Vin), and the inductance (Lm) of the second reactor; and a comparator (14) that compares the duty ratio with the carrier (C2) to output a control signal (SSl) for controlling the chopping.

The charge and discharge circuit according to the present invention is the charge and discharge circuit to be controlled in the controlling method. The charge and discharge circuit (4) further includes a current blocking unit (4c) provided in the first power supply line or the second power supply line, the current blocking unit blocking a current from flowing from the buffer circuit (4a) to the first capacitor (C3).

The direct power converter according to the present invention includes the charge and discharge circuit (4), the first power supply line (LH), the second power supply line (LL), the diode rectifier (2), the first capacitor (C3), the first reactor (L3), and the inverter (5).

Effects of the Invention

The charge and discharge circuit, the method for controlling the charge and discharge circuit, the control device for the charge and discharge circuit, and the direct power converter according to this invention prevent sampling of a control system that controls an inverter and updating of a command value from being degraded, even when the resonance of an LC filter is suppressed using a suppressing current.

The object, features, aspects and advantages of the present invention will become more apparent from the following detailed description and the accompanying drawings.

BRIEF DESCRIPTION OF DRAWINGS

FIG. 3 is a circuit diagram illustrating an equivalent circuit of the direct power converter in FIG. 1;

FIG. 4 is a block diagram of the equivalent circuit of FIG. 3 when the equivalent circuit is understood as configuring a control system;

FIG. 14 is a circuit diagram illustrating a modification of the diode rectifier; and FIG. 15 is a block diagram exemplifying a structure of a resonance suppression controller and the surroundings of the reactor.

DESCRIPTION OF EMBODIMENTS

A. Structure of Direct Power Converter

Before specifically describing the distinctive technique of an embodiment, a structure of a direct power converter to which the technique is to be applied will be described. Since basic operations of the structure itself are known by Japanese Patent Application Laid-Open No. 2014-96976, the details will be omitted herein.

Figure 1:
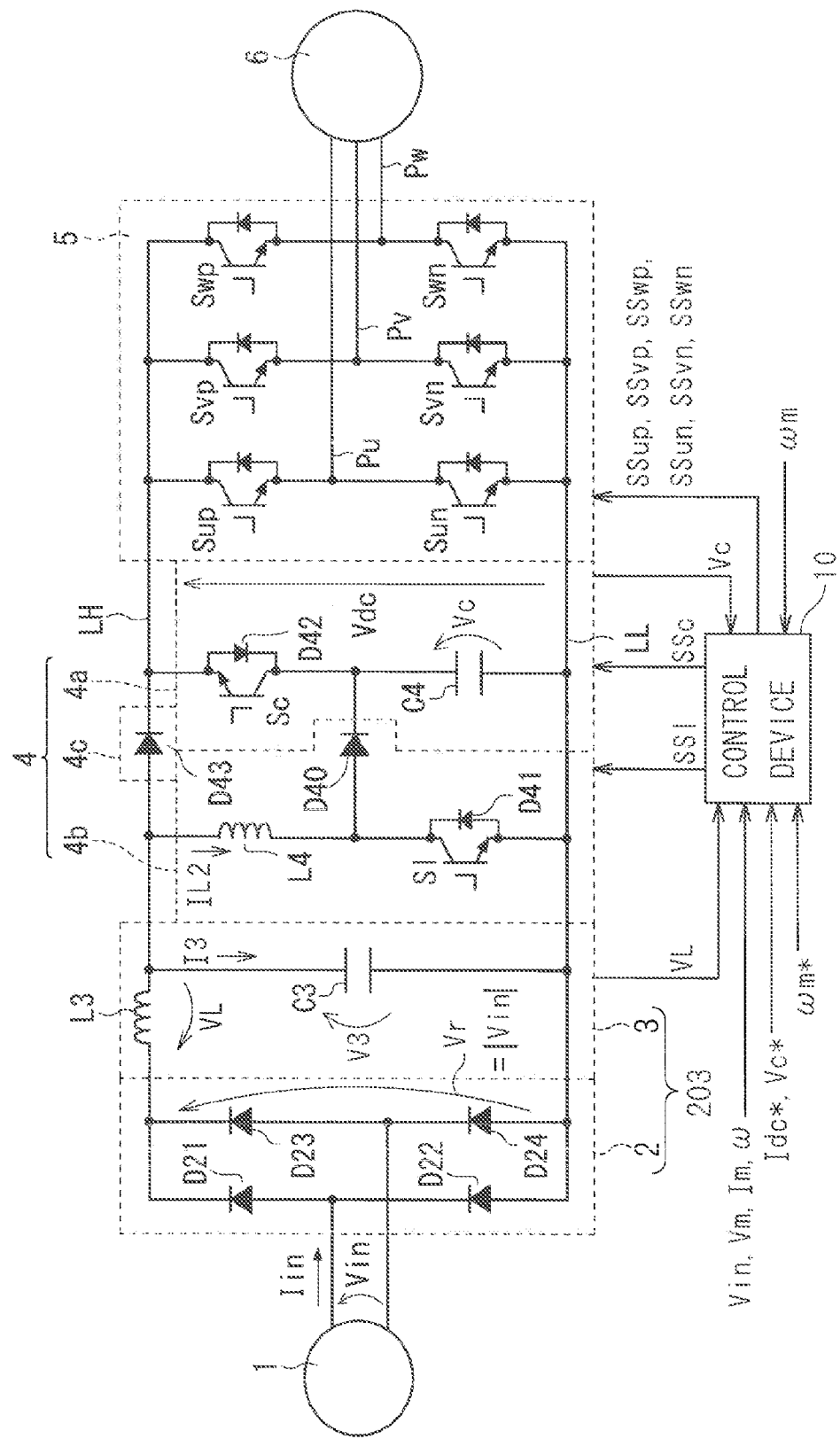
FIG. 1 illustrates an example schematic configuration of a direct power converter.

As illustrated in FIG. 1, the direct power converter includes a diode rectifier 2, an LC filter 3, a charge and discharge circuit 4, and an inverter 5. DC power lines LH and LL function as a DC link between the inverter 5 and the charge and discharge circuit 4. A potential higher than a potential applied to the DC power line LL is applies to the DC power line LH.

The diode rectifier 2 has an input side to which a single-phase AC voltage (Vin) is applied from a single-phase AC power source 1, and an output side.

The diode rectifier 2 single-phase full-wave rectifies the single-phase AC voltage Vin to convert the single-phase AC voltage Vin into a voltage Vr (=|Vin|), and outputs the voltage Vr from the output side.

Furthermore, an AC current Iin (hereinafter referred to as an "input current Iin") flows from the single-phase AC power source 1 into the input side of the diode rectifier 2.

The diode rectifier 2 includes diodes D21 to D24. The diodes D21 to D24 form a bridge circuit.

The LC filter 3 includes a reactor L3 and a capacitor C3. The capacitor C3 is provided between the DC power lines LH and LL. The reactor L3 is connected in series with the DC power line LH or LL (the DC power line LH closer to the output side of the diode rectifier 2 in the example of FIG. 1), while being more distant from the inverter 5 than the capacitor C3 is.

The capacitor C3 is, for example, a film capacitor, and has a capacitance smaller than that of an electrolytic capacitor. The capacitor C3 hardly smoothes the voltage Vr output by the diode rectifier 2. Thus, although a both-end voltage V3 across the capacitor C3 is a DC voltage, it ripples with the same period as that with which the voltage Vr ripples.

The combination of the diode rectifier 2 and the LC filter 3 can be understood as a rectifying circuit 203 having the input side to which the single-phase AC voltage Vin is applied and the output side connected between the DC power lines LH and LL. Although the voltage Vr is applied between the reactor L3 and the capacitor C3 that are connected in series in FIG. 1, output of the diode rectifier 2 is applied to the capacitor C3 without through the reactor L3, depending on a structure of the rectifying circuit 203. Such modifications of the rectifying circuit will be described later.

The charge and discharge circuit 4 is provided closer to the inverter 5 with respect to the capacitor C3, and includes a buffer circuit 4a, a booster circuit 4b, and a current blocking unit 4c. The buffer circuit 4a includes a capacitor C4, and provides and receives powers to and from the DC power lines LH and LL.

The buffer circuit 4a further includes a transistor (here, an insulated gate bipolar transistor: hereinafter abbreviated as an "IGBT") Sc connected in antiparallel to a diode D42. The transistor Sc is connected in series with the capacitor C4 between the DC power lines LH and LL, where the transistor Sc is closer to the DC power line LH with respect to the capacitor C4. The antiparallel connection herein means parallel connection in which forward directions are opposite to each other. Specifically, the forward direction of the transistor Sc is a direction from the DC power line LL to the DC power line LH. The forward direction of the diode D42 is a direction from the DC power line LH to the DC power line LL. The transistor Sc and the diode D42 can collectively be understood as one switch element (a first switch). In other words, the capacitor C4 is provided between the DC power lines LH and LL through the first switch.

The booster circuit 4b boosts the both-end voltage V3 across the capacitor C3 (a rectified voltage output by the rectifying circuit 203 in the structure of FIG. 1) to charge the capacitor C4. The charge circuit 4b includes, for example, a diode D40, a reactor L4, and a transistor (here, an IGBT) S1. The diode D40 has a cathode and an anode. The cathode is connected between the first switch and the capacitor C4. The reactor L4 is connected between the DC power line LH and the anode of the diode D40. The transistor S1 is connected between the DC power line LL and the anode of the diode D40. The transistor S1 is connected in antiparallel to a diode D41. The transistor S1 and the diode D41 can collectively be understood as one switch element (a second switch). This structure is known as a generally-called boost chopper.

The capacitor C4 is charged by the charge circuit 4b, and maintains a both-end voltage Vc higher than the both-end voltage V3. Specifically, a current IL2 is caused to flow from the DC power line LH to the DC power line LL through the second switch to accumulate energy in the reactor L4. Then, the second switch is turned OFF, so that this energy is accumulated in the capacitor C4 through the diode D40. Since the current IL2 flows from the DC power line LH to the DC power line LL and the polarity is not reversed, the current IL2 is a direct current.

The both-end voltage Vc is higher than the both-end voltage V3, so that a current basically does not flow through the diode D42. Thus, whether the first switch is conducting or non-conducting depends solely on whether the transistor Sc is conducting or non-conducting. Thus, the first switch including not only the transistor Sc but also the diode D42 may be referred to as a switch Sc.

Upon conduction of the switch Sc, the capacitor C4 discharges to the DC link. A duty ratio at which this switch Sc is brought into conduction will be referred to as a discharge duty dc. The discharge duty dc is controllable.

Furthermore, since the DC power line LH is higher in potential than the DC power line LL, a current basically does not flow through the diode D41. Thus, whether the second switch is conducting or non-conducting depends solely on whether the transistor S1 is conducting or non-conducting. Thus, the second switch including not only the transistor S1 but also the diode D41 may be referred to as a switch S1.

The booster circuit 4b determines whether the current IL2 is caused to flow through the capacitor C4. Specifically, the switch S1 chops the current IL2 at a boost duty dl that is a duty ratio. This chopping is performed by comparison between the boost duty dl and a carrier C2 to be described later.

The current blocking unit 4c is provided in the DC power line LH or LL between the capacitors C3 and C4, and blocks the current from flowing from the capacitor C4 to the capacitor C3. The booster circuit 4b makes the both-end voltage Vc across the capacitor C4 higher than the both-end voltage V3 across the capacitor C3. However, the current blocking unit 4c blocks the current from flowing from the capacitor C4 to the capacitor C3. Thus, the both-end voltage V3 avoids an influence of the both-end voltage Vc.

The current blocking unit 4c is materialized by, for example, a diode D43. The diode D43 is provided in the DC power line LH in the example of FIG. 1. The forward direction of the diode D43 is a direction from the diode rectifier 2 to the inverter 5.

The inverter 5 converts, to an AC voltage, a DC voltage Vdc generated between the DC power lines LH and LL closer to the inverter 5 than to the charge and discharge circuit 4, and outputs the AC voltage to output terminals Pu, Pv, and Pw.

The inverter 5 includes six switching elements Sup, Svp, Swp, Sun, Svn, and Swn. The switching elements Sup, Svp, and Swp are connected between the DC power line LH and the output terminals Pu, Pv, and Pw, respectively. The switching elements Sun, Svn, and Swn are connected between the DC power line LL and the output terminals Pu, Pv, and Pw, respectively. The inverter 5 forms a generally-called voltage source inverter, and includes six diodes.

Each of the six diodes is arranged such that its cathode is directed toward the DC power line LH and its anode is directed toward the DC power line LL. One of the six diodes is connected in parallel to the switching element Sup between the output terminal Pu and the DC power line LH. Likewise, the other five diodes are connected in parallel to the switching elements Svp, Swp, Sun, Svn, and Swn, respectively.

For example, IGBTs are used as the switching elements Sup, Svp, Swp, Sun, Svn, and Swn. The six diodes are connected in antiparallel to the IGBTs that are used as the switching elements Sup, Svp, Swp, Sun, Svn, and Swn, respectively.

An inductive load 6 is, for example, a rotary machine, and rotates according to an AC voltage from the inverter 5.

B. Control Based on Both-End Voltage VL Across Reactor L3

Figure 2:
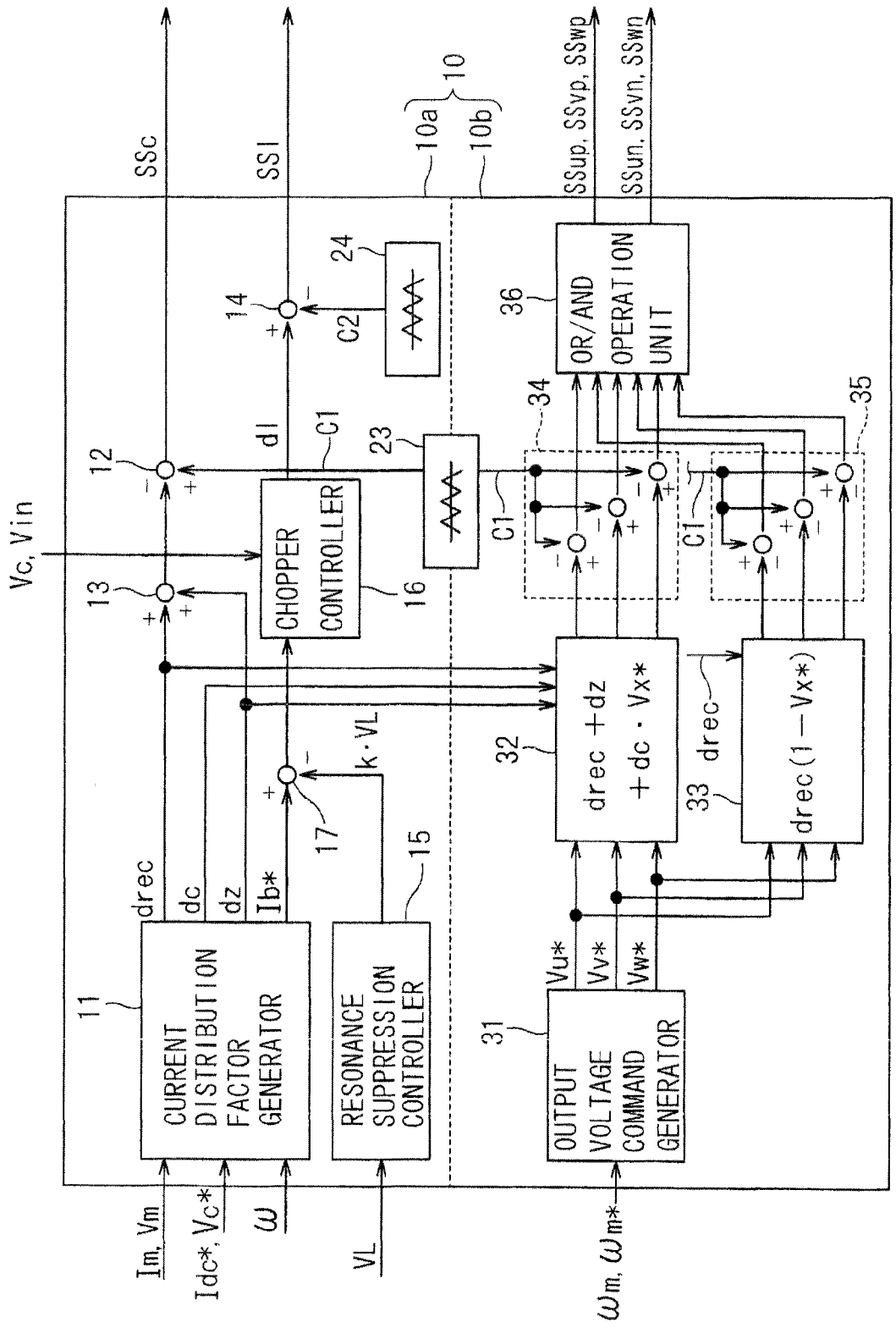
FIG. 2 is a block diagram illustrating an example schematic configuration of a control device that controls the direct power converter.

FIG. 2 is a block diagram illustrating an example schematic configuration of a control device 10 that controls the direct power converter. The control device 10 includes a block 10a functioning as a control device for the charge and discharge circuit 4, and a block 10b functioning as a control device for the inverter 5.

The block 10a includes a current distribution factor generator 11, a resonance suppression controller 15, an adder 13, a subtractor 17, a chopper controller 16, comparators 12 and 14, and carrier generators 23 and 24.

The block 10b includes an output voltage command generator 31, arithmetic units 32 and 33, comparators 34 and 35, and an OR/AND operation unit 36.

The current distribution factor generator 11 receives an amplitude Vm of the single-phase AC voltage Vin, an amplitude Im of the input current Iin, a command value Idc* of a DC current Idc to be input to the inverter 5, a command value Vc* of the both-end voltage Vc, and a power angular velocity ω. The amplitudes Vm and Im and the power angular velocity ω are sensed by, for example, a known sensor provided, and are input to the current distribution factor generator 11. The command values Idc* and Vc* are input by an external configuration that is not illustrated.

The current distribution factor generator 11 outputs a rectifying duty drec, a discharge duty dc, a zero duty dz, and a current command value Ib*.

The rectifying duty drec is a duty ratio at which the power is supplied from the rectifying circuit 203 (to put it differently, this can be "from the diode rectifier 2" because the LC filter 3 is normally a low-pass filter having a cut-off frequency significantly higher than that of the power angular velocity ω) to the DC link. Since the both-end voltage Vc is higher than the both-end voltage V3, no current flows from the rectifying circuit 203 to the DC link during the conduction of the switch Sc. Thus, a sum of the rectifying duty drec and the discharge duty dc is smaller than 1. The zero duty dz is a duty ratio at which neither the rectifying circuit 203 nor the charge and discharge circuit 4 supplies power to the DC link. A sum of the zero duty dz, the rectifying duty drec, and the discharge duty dc is equal to 1.

The current command value Ib* is a command value of the current IL2 to be input to the booster circuit 4b, specifically, the current IL2 that is caused to flow through the reactor L4, when no consideration is given to suppression of the resonance of the LC filter 3.

Since Japanese Patent Application Laid-Open No. 2014-96976, Japanese Patent Application Laid-Open No. 2011-193678, and Japanese Patent Application Laid-Open No. 2014-82926 describe a method for determining the rectifying duty drec, the discharge duty dc, the zero duty dz, and the current command value Ib* in detail, the details will be omitted herein.

The resonance suppression controller 15 receives a both-end voltage VL across the reactor L3 (hereinafter referred to as a "reactor voltage VL"). As illustrated in FIG. 1, when the reactor L3 is provided in series with the DC power line LH to be closer to the capacitor C3 than to the diode rectifier 2, an end of the reactor L3 that is closer to the capacitor C3 is used as a reference for the reactor voltage VL. The reactor voltage VL is sensed by a known technique. The resonance suppression controller 15 outputs a larger correction value as the reactor voltage VL is higher. The resonance suppression controller 15 outputs, for example, a product of the reactor voltage VL and a predetermined value k (>0) as a correction value k·VL. This correction value k·VL can be understood as being directly proportional to the reactor voltage VL.

The subtractor 17 subtracts the correction value k·VL from the current command value Ib*, and outputs a corrected current command value (Ib*−k·VL). This corresponds to use of the value (−k·VL) as a command value of the suppressing current that is caused to flow through the reactor L4.

The current command value (Ib*−k·VL) to be a target value of the current IL2 is reduced more as the reactor voltage VL is higher. Accordingly, control for reducing the current IL2 is performed. When the reactor L3 is provided in series with the DC power line LL to be closer to the capacitor C3 than to the diode rectifier 2, an end of the reactor L3 that is closer to the diode rectifier 2 is used as a reference for the reactor voltage VL. In other words, when the reactor L3 is provided between the diode rectifier 2 and the capacitor C3, a direction opposite to the direction in which the current flows through the reactor L3 is used as a positive polarity of the reactor voltage VL.

The adder 13 adds the rectifying duty drec and the zero duty dz, and the comparator 12 compares the result (drec+dz) with a carrier C1 The carrier C1 is generated by the carrier generator 23.

A result of the comparator 12 is output as a switching signal SSc to be provided to the switch Sc. The comparator 12 outputs as the switching signal SSc, for example, a signal activated while the carrier C1 is larger than or equal to the value (drec+dz). The switch Sc is turned ON with activation of the switching signal SSc.

The chopper controller 16 receives the both-end voltage Vc and the single-phase AC voltage Vin (more precisely, respective values of the voltages), and outputs the boost duty dl on the basis of the corrected current command value (Ib*−k·VL). Since a technique for determining the boost duty dl from the both-end voltage Vc, the single-phase AC voltage Vin, and the inductance Lm of the reactor L4 on the basis of the given current command value is also a known technique from, for example, Japanese Patent Application Laid-Open No. 2014-96976, Japanese Patent Application Laid-Open No. 2011-193678, and Japanese Patent Application Laid-Open No. 2014-82926, the details will be omitted herein.

The comparator 14 compares the boost duty dl with the carrier C2. The carrier C2 is generated by the carrier generator 24. A result of the comparator 14 is output as a control signal SSl for controlling the closing and opening of the switch Sl. The comparator 14 outputs as the control signal SSl, for example, a signal activated while the carrier C2 is smaller than or equal to the boost duty dl. The switch Sl is turned ON with activation of the switching signal SSl.

The output voltage command generator 31 generates phase voltage commands Vu*, Vv*, and Vw*. The output voltage command generator 31 receives a rotational velocity ωm of the inductive load 6, and a command value ωm* of the rotational velocity ωm in the example of FIG. 2. The rotational velocity ωm is sensed by a known sensor, and the command value ωm is input by an external configuration that is not illustrated. The output voltage command generator 31 generates the phase voltage commands Vu*, Vv*, and Vw* using a known method to reduce a deviation between the rotational velocity ωm and the command value ωm*.

The arithmetic unit 32 receives the rectifying duty drec, the zero duty dz, the discharge duty dc, and the phase voltage commands Vu*, Vv*, and Vw*. The arithmetic unit 32 calculates and outputs values (drec+dz+dc·Vx*) (x represents u, v, and w). The arithmetic unit 33 receives the rectifying duty drec and the phase voltage commands Vu*, Vv*, and Vw*, and calculates and outputs values (drec·(1−Vx*)).

The comparator 34 compares the values (drec+dz+dc·Vx*) with the carrier C1, whereas the comparator 35 compares the values (drec·(1−Vx*)) with the carrier C1. The comparator 34 outputs, for example, signals activated while the carrier C1 is larger than or equal to the values (drec+dz+dc·Vx*), whereas the comparator 35 outputs, for example, signals activated while the carrier C1 is smaller than or equal to the values (drec·(1−Vx*)).

Accordingly, since the carrier C1 can be used for any of the blocks 10a and 10b, the carrier generator 23 is illustrated across the boundary between the blocks 10a and 10bd in FIG. 2.

The OR/AND operation unit 36 receives results of the comparison by the comparator 34 and 35. ORs of the results of the comparison by the comparator 34 and 35 are output as switching signals SSup, SSvp, and SSwp to be provided, respectively, to the switching elements Sup, Svp, and Swp, and negation of these are output as switching signals SSun, SSvn, and SSwn to be provided, respectively, to the switching elements Sun, Svn, and Swn.

The following will describe that correction of the current command value using the correction value k·VL suppresses the resonance of the LC filter 3.

FIG. 3 is a circuit diagram illustrating an equivalent circuit of the direct power converter of FIG. 1. Here, a current IL that flows through the reactor L3 and a current I3 that flows through the capacitor C3 were introduced. The current IL is output from the diode rectifier 2. Thus, considering the reference of the reactor voltage VL (or a direction of a positive polarity of the reactor voltage VL), it is clear that this equivalent circuit holds even when the reactor L3 is connected in series with any one of the DC power lines LH and LL between the diode rectifier 2 and the capacitor C3.

As understood from FIG. 1, the current flowing from the LC filter 3 branches into the booster circuit 4b and the current blocking unit 4c. Thus, with introduction of an inverter current I4 that flows through the inverter 5, the direct current IL2 that flows through the booster circuit 4b and the inverter current I4 to be output to the inverter 5 can be equivalently illustrated as current sources that are both connected in parallel to the capacitor C3. Here, the current IL2 is understood as a value obtained by subtracting the correction value k·VL from a current Ib. Under the assumption of k=0, the current Ib is understood as a current that flows through the reactor L4 using the current command value Ib* as a command value.

Figure 5:
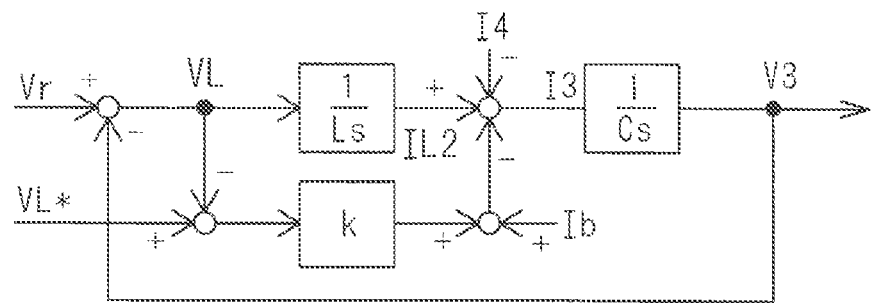
FIG. 5 is a block diagram illustrating a modification of the block diagram in FIG. 4.
Figure 6:
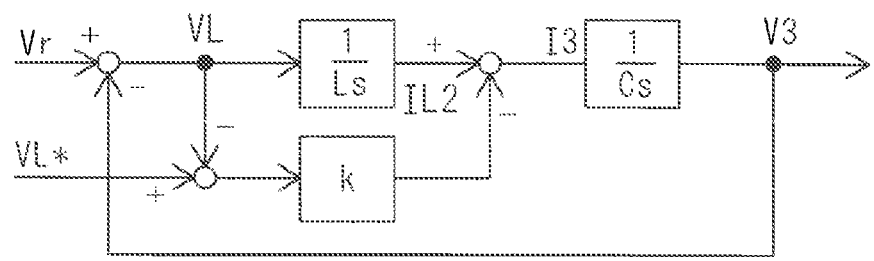
FIG. 6 is a block diagram illustrating a modification of the block diagram in FIG. 5.

FIG. 4 is a block diagram of the equivalent circuit of FIG. 3 when the equivalent circuit is understood as configuring a control system. This block diagram can be modified into block diagrams in FIGS. 5, 6, and 7 in order according to Japanese Patent No. 4067021. In order to materialize the control system for suppressing the resonance, the command value VL* is 0.

Figure 7:
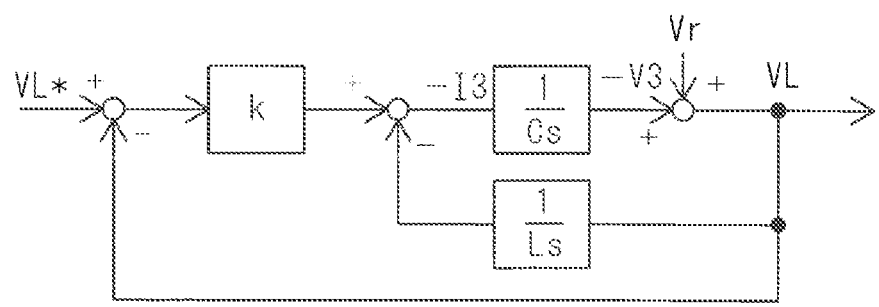
FIG. 7 is a block diagram illustrating a modification of the block diagram in FIG. 6.

The block diagram of FIG. 7 shows that the direct power converter in FIG. 1 can be understood as a feedback system on the reactor voltage VL using the voltage Vr as a disturbance. FIG. 7 also shows that the command value VL* is used as a target value of the reactor voltage VL and that the both-end voltage V3 is controlled to be identical to the voltage Vr because the reactor voltage VL follows the command value VL*=0 without depending on the voltage Vr. Accordingly, fluctuations in voltage subject to the resonance of the LC filter 3 are suppressed.

Under the control according to the embodiment, the suppressing current (this corresponds to the correction value k·VL of the current Ib) is not superimposed on the inverter current I4 but the current IL2 is controlled by the reactor voltage VL. Since the current IL2 is controlled by an operation of the booster circuit 4b, that is, chopping by the switch Sl, a control period of the current IL2 is shorter than a control period of the inverter 5. According to FIG. 2, the carrier C2 is shorter in period than the carrier C1, and the current IL2 is controlled by the reactor voltage VL at a frequency higher than that at which the inverter 5 is controlled.

It is clear that sampling of the control system that controls the inverter 5 and updating of a command value are prevented from being degraded even when the resonance of the LC filter 3 is suppressed using the suppressing current according to the embodiment.

FIGS. 8 to 11 are graphs representing waveforms of the input current Iin, the reactor voltage VL, and the current IL2 when the DC voltage Vdc is controlled at a constant value.

Figure 8:
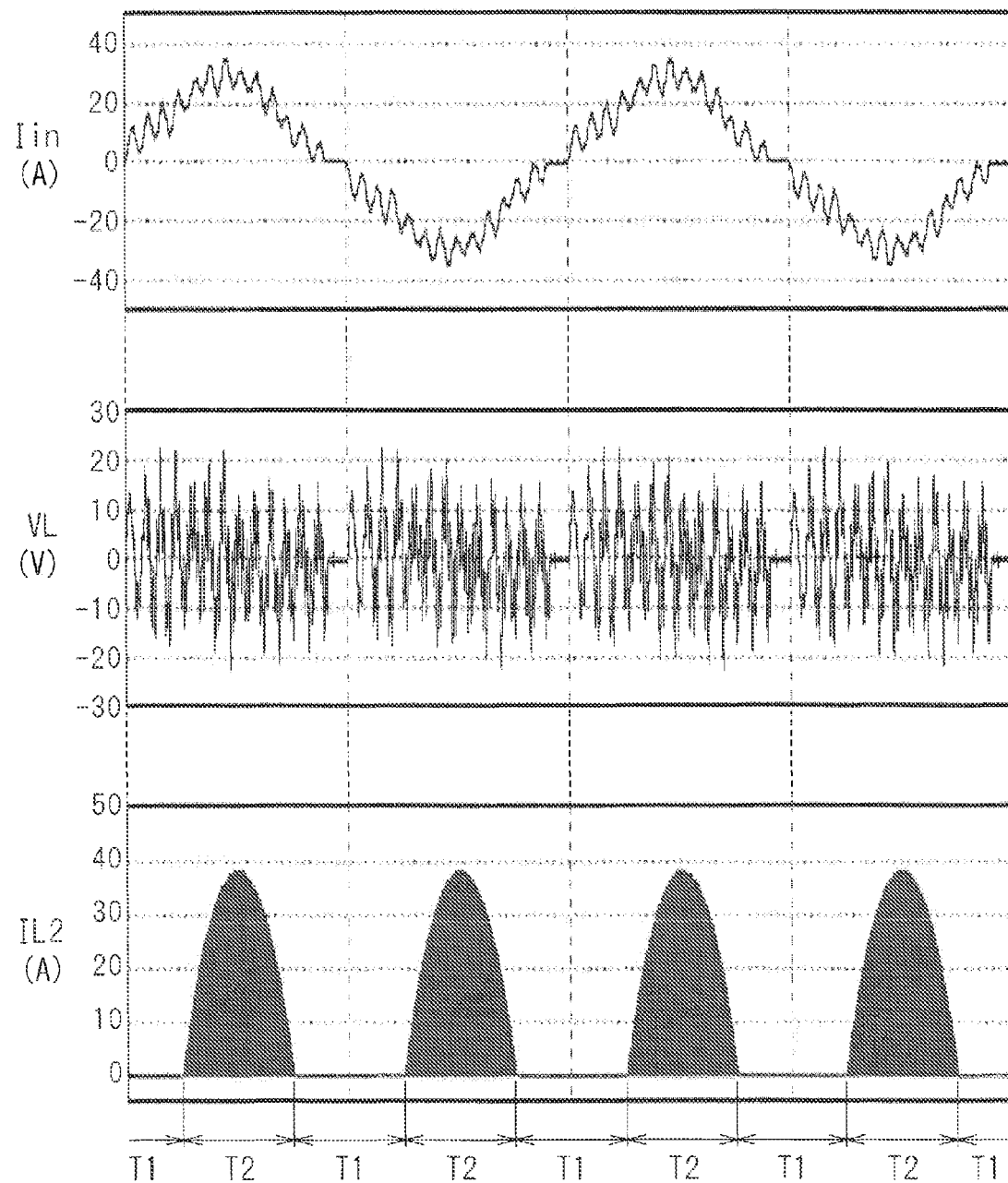
FIGS. 8 to 11 are graphs representing waveforms of an input current, a reactor voltage, and a current.
Figure 9:
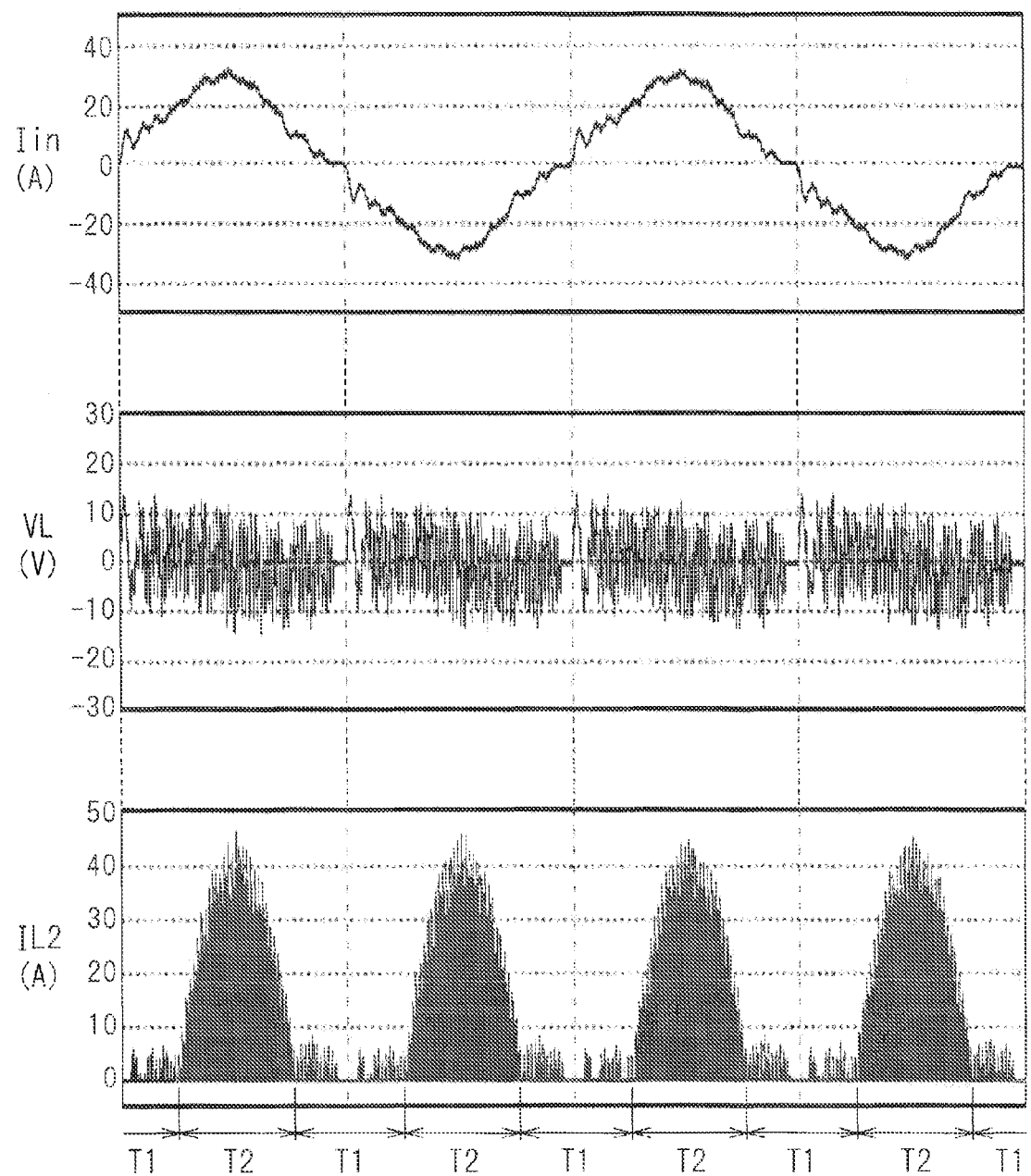

FIGS. 8 and 9 illustrate application of a control method (hereinafter provisionally referred to as "half-period control") for alternating between a period for charging the capacitor C4 (a "receiving period" according to Japanese Patent Application Laid-Open No. 2011-193678 where the discharge duty dc is zero and the boost duty dl is positive) and a period for discharging the capacitor C4 (a "providing period" according to Japanese Patent Application Laid-Open No. 2011-193678 where the discharge duty dc is positive) per half period of the voltage Vr (i.e., per quarter period of the single-phase AC voltage Vin) as disclosed by Japanese Patent Application Laid-Open No. 2011-193678.

With introduction of a phase ωt of the single-phase AC voltage Vin, the providing period and the receiving period can be regarded as a period in which a cosine value cos (2ωt) that is a cosine of a value twice the phase ωt is positive and a period in which this cosine value (2ωt) is negative, respectively.

Figure 10:
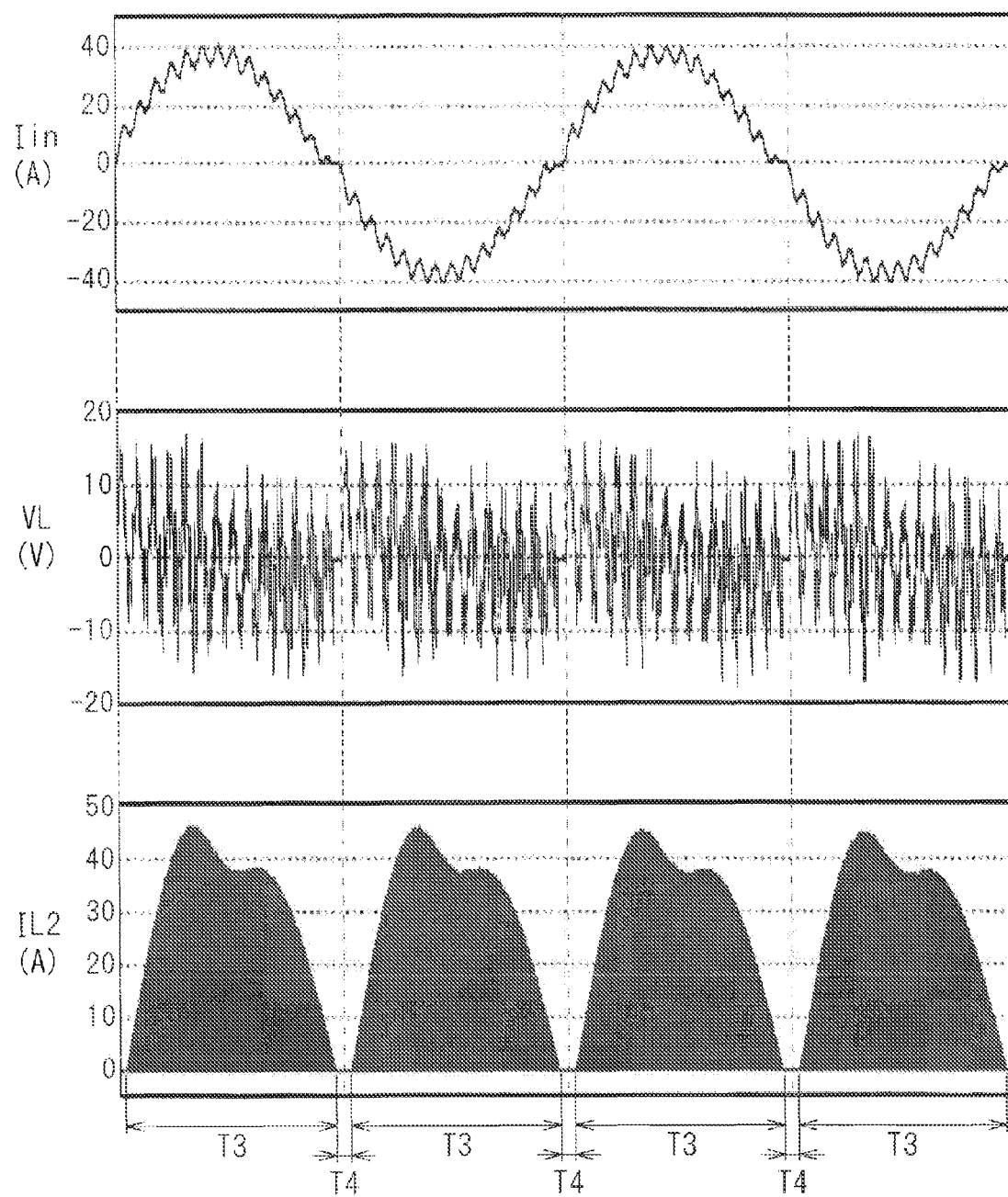
Figure 11:
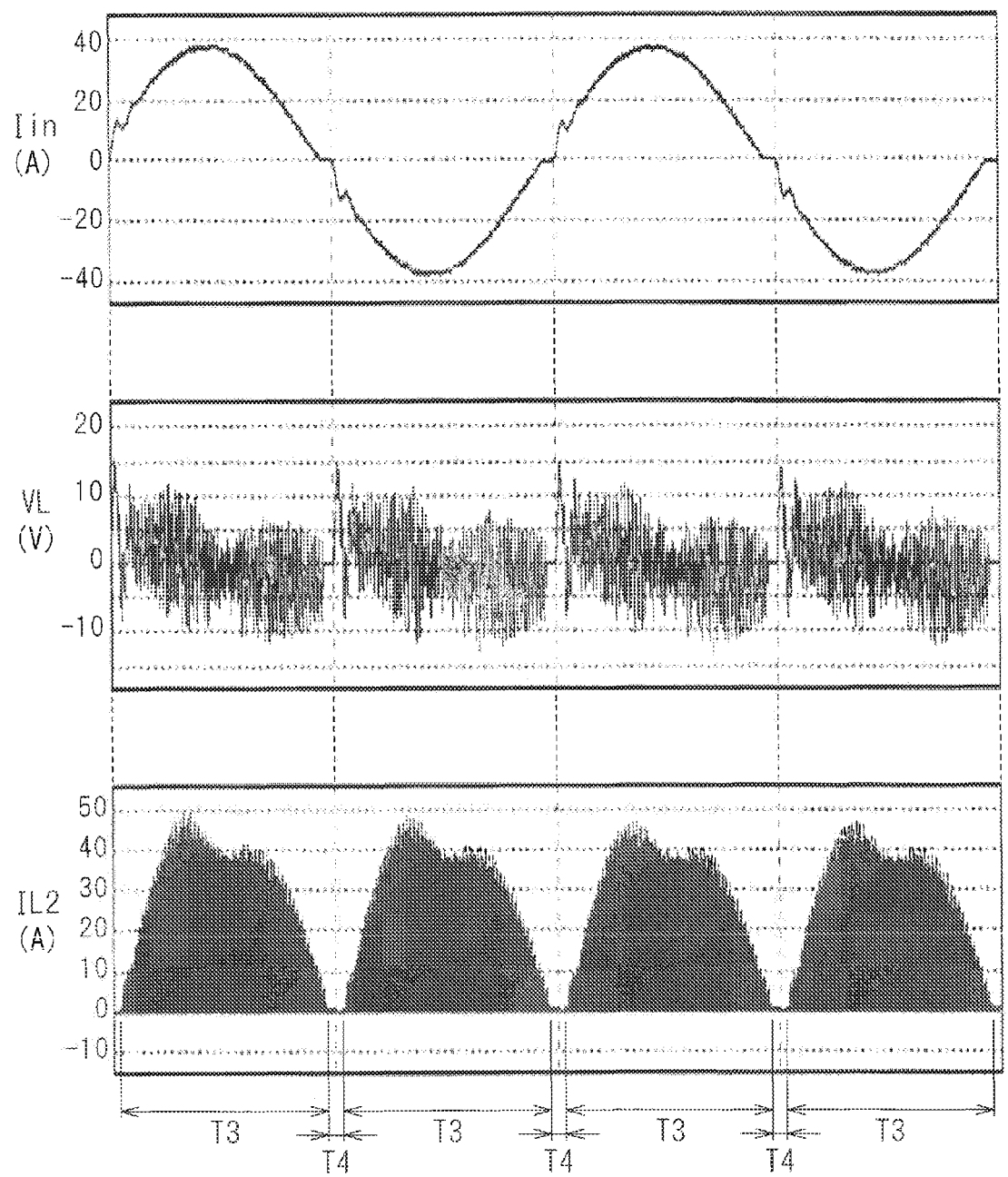

FIGS. 10 and 11 illustrate application of a control method for charging the capacitor C4 (hereinafter provisionally referred to as "charge-discharge control") with the current IL2 during at least a part of a period in which the discharge duty dc is larger than 0 as disclosed by Japanese Patent Application Laid-Open No. 2014-82926.

Both FIGS. 8 and 10 illustrate that the correction using the correction value k·VL is not performed. FIG. 8 illustrates that the current IL2 flows not during a proving period T1 but only during a receiving period T2 with the half-period control reflected. FIG. 10 illustrates that with the charge-discharge control reflected, the current IL2 flows not during a discharge period T4 (a period in which the boost duty dl is zero) according to Japanese Patent Application Laid-Open No. 2014-82926 but only during a period T3 that is a sum of a charge period and a charge-discharge period (a period in which the boost duty dl is positive) according to Japanese Patent Application Laid-Open No. 2014-82926.

Both FIGS. 9 and 11 illustrate that the correction using the correction value k·VL is performed. FIG. 9 illustrates that the current IL2 flows also during the proving period T1 in FIG. 8. Furthermore, FIG. 11 illustrates that the current IL2 flows also during the discharge period T4 in FIG. 10.

Thus, the boost duty dl is influenced by the correction value k·VL with the process of the chopper controller 16 (see FIG. 2), and is not necessarily set according to the definitions defined on the proving period and the receiving period in Japanese Patent Application Laid-Open No. 2011-193678 and defined on the charge period, the discharge period, and the charge-discharge period in Japanese Patent Application Laid-Open No. 2014-82926. However, the "half-period control" and the "charge-discharge control" will be provisionally used for the sake of simplicity in the following description, regardless of the presence or absence of the correction using the correction value k·VL.

As understood from the comparison between FIG. 8 and FIG. 9, ringing in the input current Iin is reduced with introduction of the correction using the correction value k·VL under the half-period control. Similarly, as understood from the comparison between FIG. 10 and FIG. 11, ringing in the input current Iin is reduced with introduction of the correction using the correction value k·VL under the charge-discharge control.

It is visually identified that such introduction of the correction using the correction value k·VL enables reduction in the influence of the resonance of the LC filter 3, regardless of whether the half-period control or the charge-discharge control is applied.

When the half-period control is applied, the current command value Ib* is set to zero during the proving period T1. Thus, only when the reactor voltage VL is negative, the suppressing current flows during the proving period T1.

When the charge-discharge control is applied, the current command value Ib* is larger than the correction value k·VL during many periods. Thus, the corrected current command value (Ib*−k·VL) is also positive during many periods. Accordingly, an advantageous effect of causing the suppressing current to flow through the reactor L4 and suppressing the resonance of the LC filter 3 is enhanced, regardless of whether the reactor voltage VL that is a both-end voltage across the reactor L3 is positive or negative.

C. Modification

In the rectifying circuit 203, the positional relationship between the diode rectifier 2, the capacitor C3, and the reactor L3 is not limited to the one in the examples. Since the reactor component and the capacitor component of the diode rectifier 2 itself are negligible, various modifications to be described below are possible.

Figure 12:
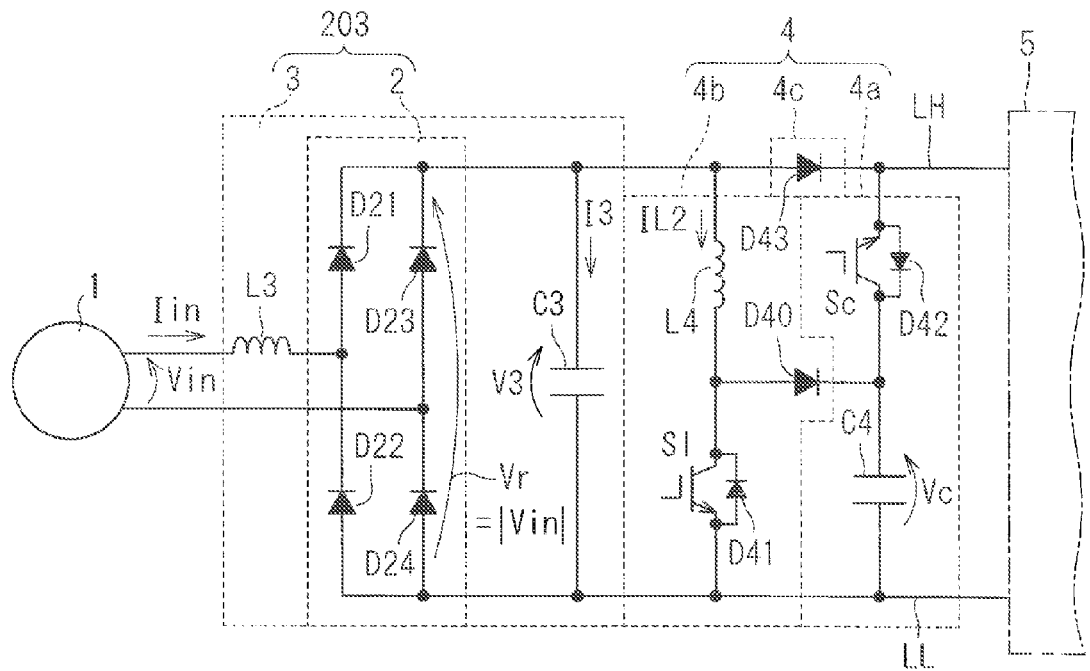
FIG. 12 is a circuit diagram illustrating a modified positional relationship between a reactor and a diode rectifier.

FIG. 12 is a circuit diagram illustrating a modified positional relationship between the reactor L3 and the diode rectifier 2. In the examples above, the reactor L3 is more distant from the inverter 5 than the capacitor C3 is, and is directly connected in series with the DC power line LH (obviously, the reactor L3 may be directly connected to the DC power line LL). However, the reactor L3 is more distant from the inverter 5 than the capacitor C3 is, and is indirectly connected in series with the DC power line LH through the diode rectifier 2. Specifically, the reactor L3 is connected in series with the single-phase AC power source 1 with respect to the input side of the diode rectifier 2.

With the structure, the reactor L3 is more distant from the inverter 5 than the diode rectifier 2 is, and the voltage Vr is a rectified voltage Vrec output by the rectifying circuit 203. In these cases, the reactor L3 is connected in series with the single-phase AC power source 1 with respect to the input side of the diode rectifier 2. Thus, it is clear that the equivalent circuit in FIG. 3 also applies to such a structure similarly as the above stated embodiment, and the same functions and advantages above can be obtained by regarding a positive direction of the reactor voltage VL (polarity of the reactor voltage VL) as a direction of the single-phase AC voltage Vin from the high potential to the low potential.

Such a modification adopts a structure for determining the reactor voltage VL with reference to a value obtained by measuring a potential difference across the reactor L3 in a fixed direction and to the direction of the single-phase AC voltage Vin from the high potential to the low potential and outputting a correction value on the basis of the reactor voltage VL, as a replacement for the resonance suppression controller 15 (see FIG. 2), FIG. 15 is a block diagram exemplifying a structure of a resonance suppression controller 151 adopted as a replacement for the resonance suppression controller 15 illustrated in FIG. 2, and the surroundings of the reactor L3 (see FIG. 1) when the reactor L3 is more distant from the inverter 5 than the diode rectifier 2 is.

Here, a potential difference VL1 across the reactor L3 is used with reference to the potential of the end of the reactor L3 that is closer to the diode rectifier 2. Specifically, a potential at a connection point between the reactor L3, an anode of the diode D21, and a cathode of the diode D22 serves as a reference of the potential difference.

The resonance suppression controller 151 receives the potential difference VL1 and the single-phase AC voltage Vin (more precisely, respective values thereof). The resonance suppression controller 151 includes a polarity determining unit 15b that determines a polarity of the single-phase AC voltage Vin in one direction (for example, a direction of the single-phase AC voltage Vin indicated by an arrow in FIG. 15) and outputs a value 1 or −1 according to the positive sign or the negative sign, respectively. The positive or negative sign or the phase of the single-phase AC voltage Vin may be used for the determination. Here, a potential at a connection point between an anode of the diode D23 and a cathode of the diode D24 is used as a reference of the single-phase AC voltage Vin.

The resonance suppression controller 151 includes multipliers 15a and 15c. The multiplier 15a multiplies output of the polarity determining unit 15b by the potential difference VL1. Accordingly, the multiplier 15a yields the reactor voltage VL according to the embodiment. The multiplier 15c multiplies the reactor voltage VL by the predetermined value k to yield the correction value k·VL.

Obviously, the polarity determining unit 15b can determine the polarity of the single-phase AC voltage Vin and output a value k or −k according to the positive sign or the negative sign, respectively, which does not require the multiplier 15c. Furthermore, the resonance suppression controller 15 according to the embodiment can be regarded as having a structure in which the multiplier 15a and the polarity determining unit 15b are eliminated. Such a structure obviously obtains the same functions and advantages of each embodiment.

Figure 13:
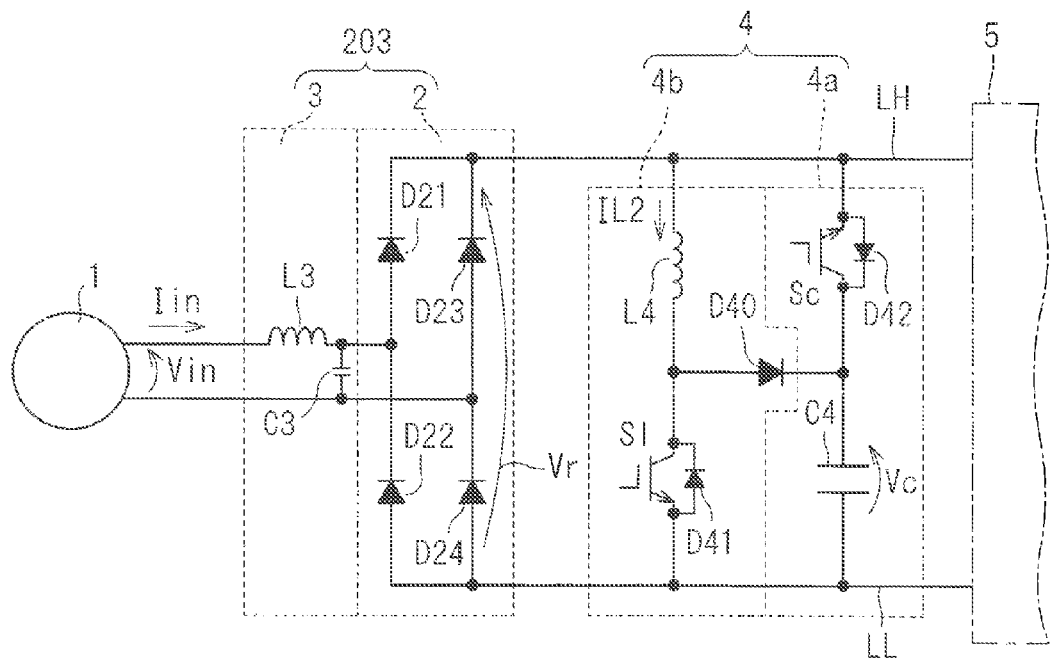
FIG. 13 is a circuit diagram illustrating a modified positional relationship between a capacitor, the reactor, and the diode rectifier.

FIG. 13 is a circuit diagram of a circuit further modified from FIG. 12, and illustrates a modified positional relationship between the reactor L3, the capacitor C3, and the diode rectifier 2. The capacitor C3 is directly connected between the DC power lines LH and LL in the above examples. However, the capacitor C3 is indirectly connected between the DC power lines LH and LL through the diode rectifier 2 in the structure illustrated in FIG. 13. Furthermore, the reactor L3 is more distant from the inverter 5 than the capacitor C3 is, and is indirectly connected in series with the DC power line LH through the diode rectifier 2. Specifically, the reactor L3 is connected in series with the single-phase AC power source 1 with respect to the input side of the diode rectifier 2 as well as the capacitor C3.

Such a structure obtains the functions and advantages of the embodiment similarly as the structure of FIG. 12, though the current I3 flowing through the capacitor C3 becomes an alternating current and thus the polarity of the both-end voltage V3 alternates. This is because in view of FIG. 7, the reactor voltage VL remains controlled at zero, regardless of whether the polarity of the current I3 flowing through the capacitor C3 and the polarity of the both-end voltage V3 are made different by the polarity of the single-phase AC voltage Vin, or even in the presence of the voltage Vr that acts as a disturbance.

Moreover, since the diode rectifier 2 also functions as the current blocking unit 4c, for example, the diode D43 in the structure of FIG. 13, an advantage of eliminating the need for the current blocking unit 4c is produced.

FIG. 14 is a circuit diagram of a circuit further modified from FIG. 13, and illustrates a modification of the diode rectifier 2. The diode rectifier 2 is divided into two groups one of which has a pair of diodes on a higher potential side input to the charge and discharge circuit 4 and the other of which is connected to the inverter 5.

Specifically, the diode rectifier 2 includes diodes D21a, D21b, D22, D23a, D23b, and D24. Anodes of the diodes D21a and D21b are connected to one end of the capacitor C3 in common, and anodes of the diodes D23a and D23b are connected to the other end of the capacitor C3 in common. Cathodes of the diodes D21a and D23a are connected to the DC power line LH in common, and both cathodes of the diodes D21b and D23b are connected to the switch Sl through the reactor L4. In other words, the diode D21 doubles as the diode D21a and D21b and the diode D23 doubles as the diode D23a and D23b in the structure illustrated in FIG. 14 with respect to the circuit illustrated in FIG. 13. However, the reactor L4 is not directly connected to the DC power line LH in the charge and discharge circuit 4.

In such a structure, the diodes D21a, D23a, D22, and D24 form a bridge circuit that applies the voltage Vr to the DC power line LH, and the D21b, D23b, D22, and D24 form a bridge circuit that applies the voltage Vr to the DC power line LH. Thus, the diode rectifier 2 can be understood as including these two bridge circuits. The structure obviously obtains the same functions and advantages of each embodiment.

While this invention has been described in detail, the foregoing description is in all aspects illustrative and does not restrict the invention. It is therefore understood that numerous modifications and variations can be devised without departing from the scope of the invention.

The invention claimed is:

1. A method for controlling a charge and discharge circuit in a direct power converter, said direct power converter including:
   a first power supply line;
   a second power supply line to which a potential lower than a potential applied to said first power supply line is applied;
   a rectifying circuit having an input side to which a single-phase AC voltage is applied, and an output side to be connected to said first and second power supply lines;
   said charge and discharge circuit that is provided between said first and second power supply lines and is closer to said output side of said rectifying circuit; and
   an inverter that receives a DC voltage that is a voltage between said first and second power supply lines,
   said rectifying circuit including:
   a diode rectifier that performs single-phase full-wave rectification;
   a first capacitor to be connected between said first and second power supply lines directly or indirectly through said diode rectifier; and
   a first reactor to be connected in series with said first power supply line or said second power supply line directly or indirectly through said diode rectifier, said first reactor being more distant from said inverter than said first capacitor is, and
   said charge and discharge circuit including:
   a buffer circuit including a second capacitor provided between said first and second power supply lines, said buffer circuit discharging said second capacitor at a controllable duty ratio; and
   a booster circuit that boosts a rectified voltage output by said rectifying circuit to charge said second capacitor,
   said method reducing a DC current to be input to said booster circuit more as a voltage across said first reactor is higher.

2. The method for controlling a charge and discharge circuit according to claim 1,
   wherein said first reactor is provided between said diode rectifier and said first capacitor, and a direction opposite to a direction of a current flowing through said first reactor is used as a positive polarity of said voltage across said first reactor.

3. The method for controlling a charge and discharge circuit according to claim 2,
   wherein said DC current is controlled using a second command value as a target value, said second command value being obtained by subtracting a correction value from a first command value determined by an amplitude of an AC current to be input to said diode rectifier and a voltage to be output by said diode rectifier, said correction value being directly proportional to said voltage across said first reactor.

4. The method for controlling a charge and discharge circuit according to claim 3,
   wherein said booster circuit includes a second reactor through which said DC current flows, and chops said DC current to determine whether to output said DC current to said second capacitor, and
   said chopping is performed based on a result of comparison between a duty ratio and a predetermined carrier, said duty ratio being determined using said second command value, a voltage across said second capacitor, said single-phase AC voltage, and an inductance of said second reactor.

5. The method for controlling a charge and discharge circuit according to claim 3,
   wherein said buffer circuit charges said first capacitor during a period in which a cosine value is negative, and discharges said first capacitor during a period in which said cosine value is positive, said cosine value being a cosine of a value twice a phase of said single-phase AC voltage.

6. The method for controlling a charge and discharge circuit according to claim 2,
   wherein said buffer circuit charges said first capacitor during a period in which a cosine value is negative, and discharges said first capacitor during a period in which said cosine value is positive, said cosine value being a cosine of a value twice a phase of said single-phase AC voltage.

7. The method for controlling a charge and discharge circuit according to claim 1,
   wherein said first reactor is more distant from said inverter than said diode rectifier is, and a direction of said single-phase AC voltage from a high potential to a low potential is used as a positive polarity of said voltage across said first reactor.

8. The method for controlling a charge and discharge circuit according to claim 7,
   wherein said DC current is controlled using a second command value as a target value, said second command value being obtained by subtracting a correction value from a first command value determined by an amplitude of an AC current to be input to said diode rectifier and a voltage to be output by said diode rectifier, said correction value being directly proportional to said voltage across said first reactor.

9. The method for controlling a charge and discharge circuit according to claim 8,
   wherein said booster circuit includes a second reactor through which said DC current flows, and chops said DC current to determine whether to output said DC current to said second capacitor, and
   said chopping is performed based on a result of comparison between a duty ratio and a predetermined carrier, said duty ratio being determined using said second command value, a voltage across said second capacitor, said single-phase AC voltage, and an inductance of said second reactor.

10. The method for controlling a charge and discharge circuit according to claim 8,
    wherein said buffer circuit charges said first capacitor during a period in which a cosine value is negative, and discharges said first capacitor during a period in which said cosine value is positive, said cosine value being a cosine of a value twice a phase of said single-phase AC voltage.

11. The method for controlling a charge and discharge circuit according to claim 7,
wherein said buffer circuit charges said first capacitor during a period in which a cosine value is negative, and discharges said first capacitor during a period in which said cosine value is positive, said cosine value being a cosine of a value twice a phase of said single-phase AC voltage.

12. The method for controlling a charge and discharge circuit according to claim 1,
wherein said DC current is controlled using a second command value as a target value, said second command value being obtained by subtracting a correction value from a first command value determined by an amplitude of an AC current to be input to said diode rectifier and a voltage to be output by said diode rectifier, said correction value being directly proportional to said voltage across said first reactor.

13. The method for controlling a charge and discharge circuit according to claim 12,
wherein said buffer circuit charges said first capacitor during a period in which a cosine value is negative, and discharges said first capacitor during a period in which said cosine value is positive, said cosine value being a cosine of a value twice a phase of said single-phase AC voltage.

14. The method for controlling a charge and discharge circuit according to claim 12,
wherein said booster circuit includes a second reactor through which said DC current flows, and chops said DC current to determine whether to output said DC current to said second capacitor, and
said chopping is performed based on a result of comparison between a duty ratio and a predetermined carrier, said duty ratio being determined using said second command value, a voltage across said second capacitor, said single-phase AC voltage, and an inductance of said second reactor.

15. A control device for a charge and discharge circuit, said control device controlling said charge and discharge circuit in said method according to claim 14, and comprising:
a subtractor that subtracts said correction value from said first command value to obtain said second command value;
a chopper controller that determines said duty ratio using said second command value, said voltage across said second capacitor, said single-phase AC voltage, and said inductance of said second reactor; and
a comparator that compares said duty ratio with said carrier to output a control signal for controlling said chopping.

16. The method for controlling a charge and discharge circuit according to claim 1,
wherein said buffer circuit charges said first capacitor during at least a part of a period in which said duty ratio is larger than 0.

17. The method for controlling a charge and discharge circuit according to claim 1,
wherein said buffer circuit charges said first capacitor during a period in which a cosine value is negative, and discharges said first capacitor during a period in which said cosine value is positive, said cosine value being a cosine of a value twice a phase of said single-phase AC voltage.

18. A charge and discharge circuit to be controlled in said method according to claim 1, said charge and discharge circuit further including
a current blocking unit provided in said first power supply line or said second power supply line, said current blocking unit blocking a current from flowing from said buffer circuit to said first capacitor.

19. A direct power converter, comprising:
said charge and discharge circuit according to claim 18; said first power supply line; said second power supply line; said diode rectifier; said first capacitor; said first reactor; and said inverter.

* * * * *